March 10, 1925.
G. W. SMITH
1,529,146
STEERING MECHANISM
Filed Nov. 26, 1923
3 Sheets-Sheet 1
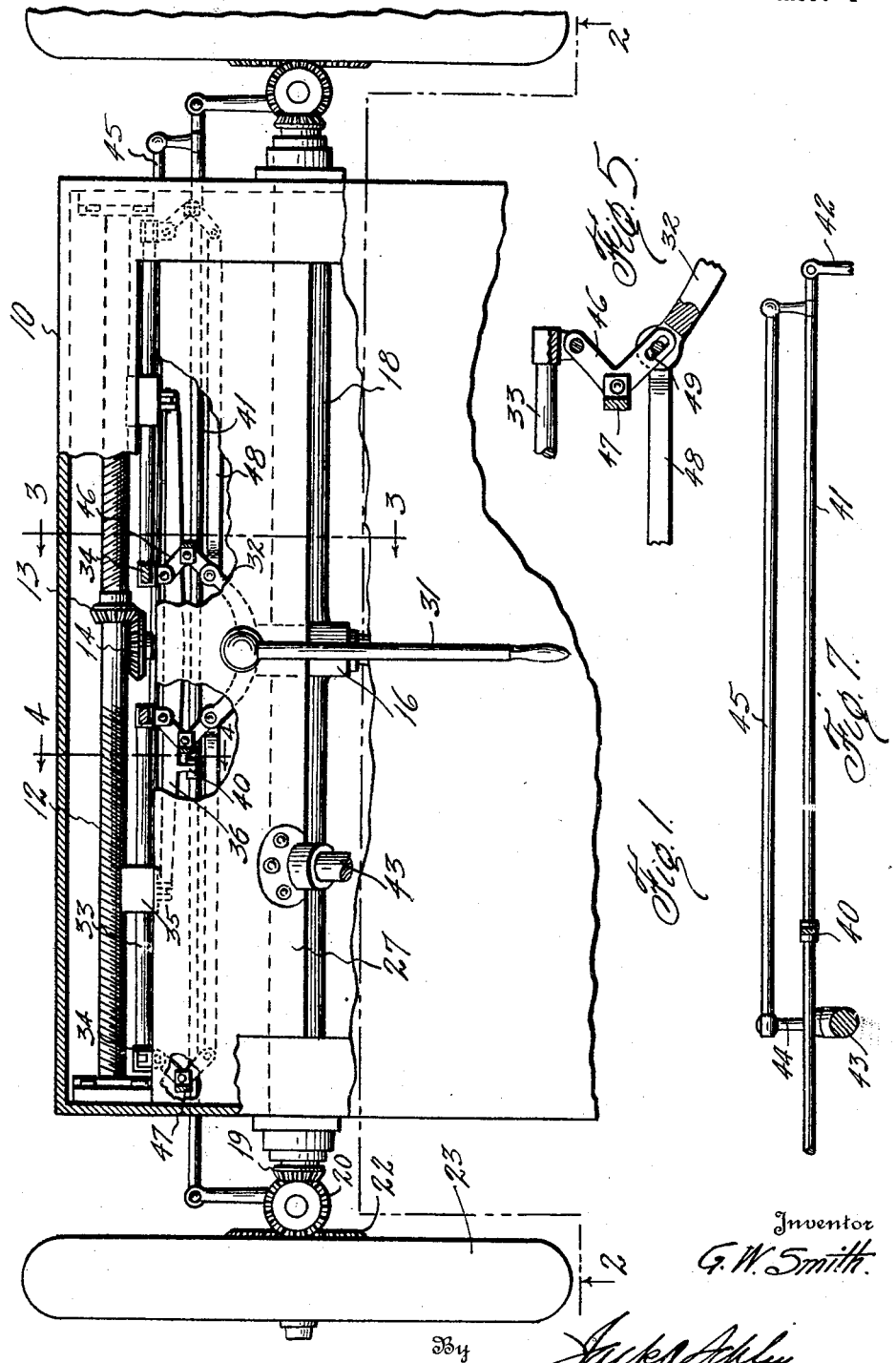
Inventor
G. W. Smith.
By Jack A. Ashley
Attorney

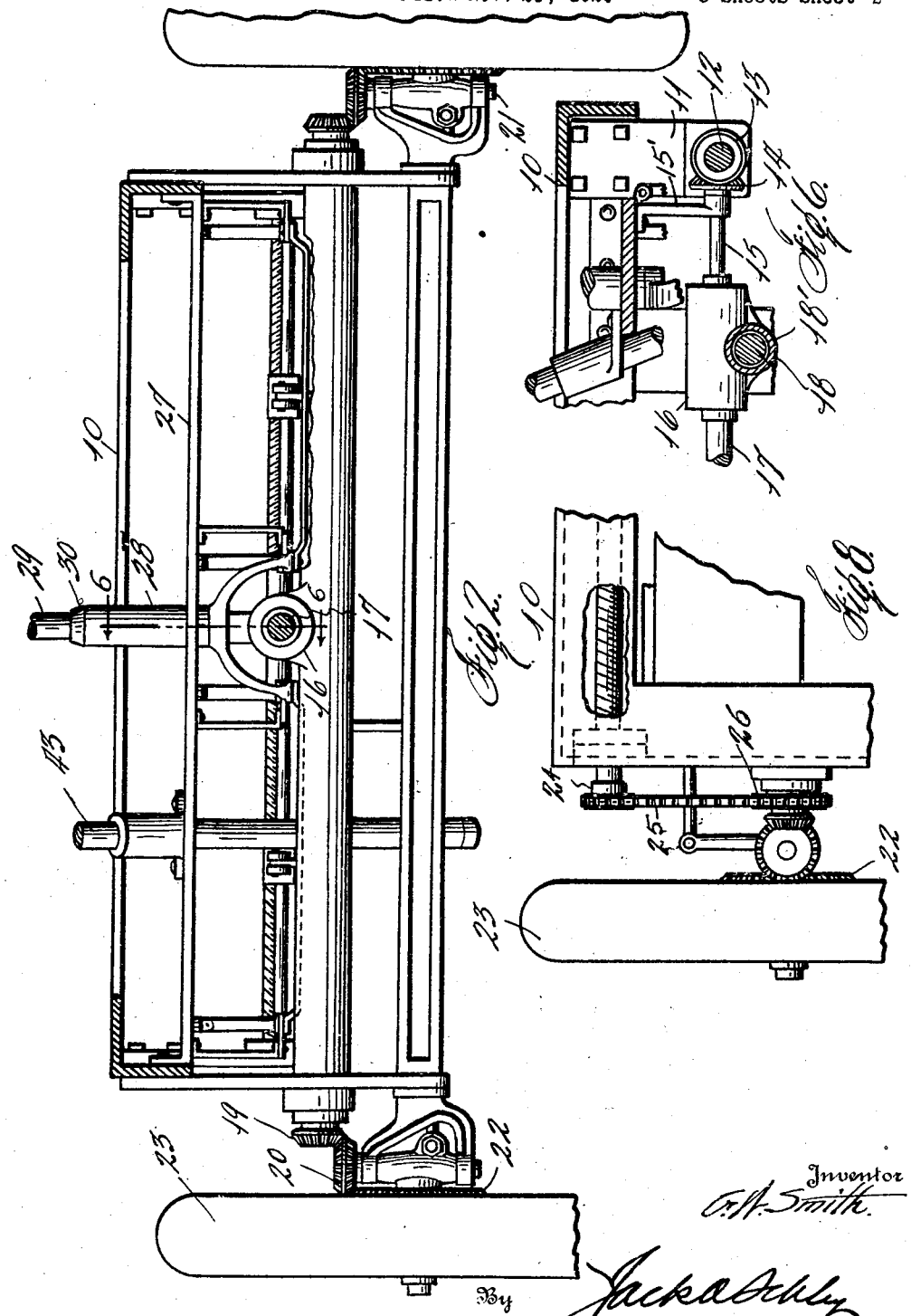

March 10, 1925.
G. W. SMITH
STEERING MECHANISM
Filed Nov. 26, 1923   3 Sheets-Sheet 3
1,529,146
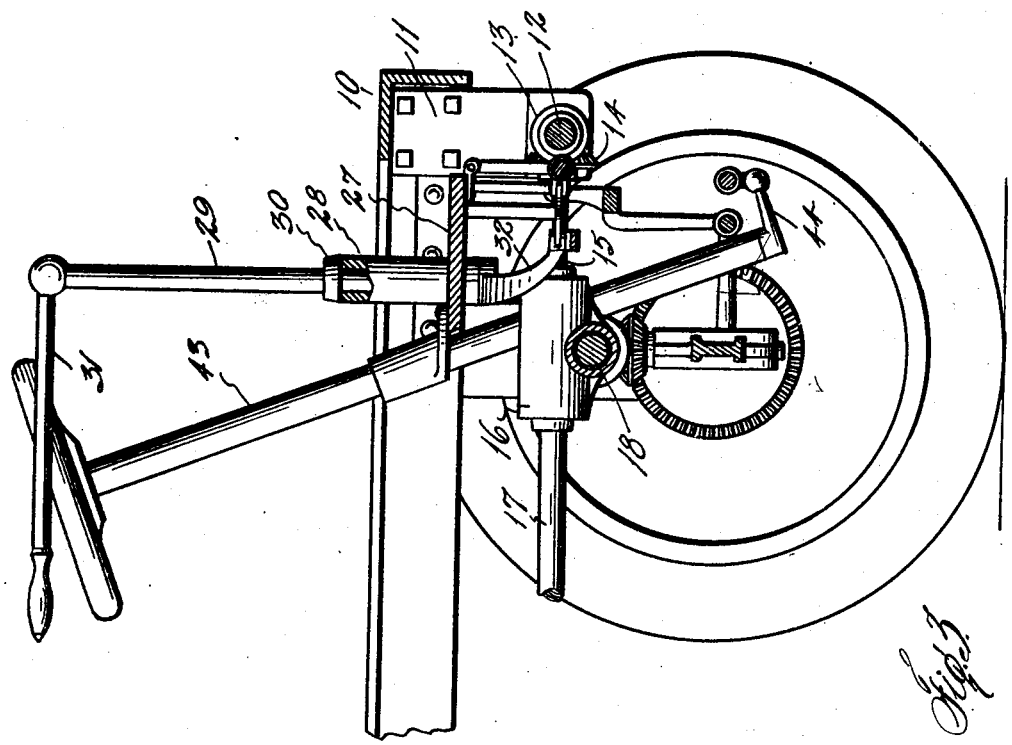
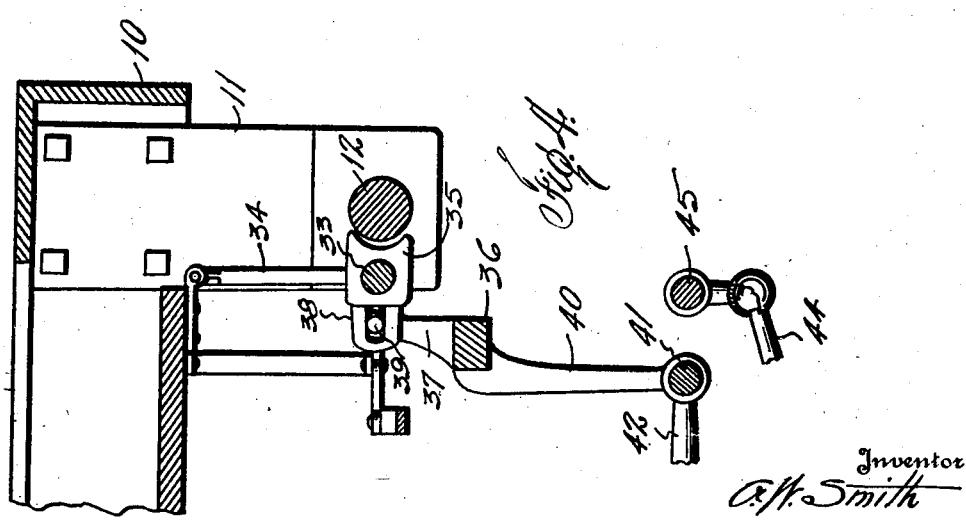

Patented Mar. 10, 1925.

1,529,146

UNITED STATES PATENT OFFICE.

GEORGE W. SMITH, OF DALLAS, TEXAS.

STEERING MECHANISM.

Application filed November 26, 1923. Serial No. 677,089.

*To all whom it may concern:*

Be it known that I, GEORGE W. SMITH, citizen of the United States of America, residing at Dallas, in the county of Dallas and State of Texas, have invented certain new and useful Improvements in Steering Mechanisms, of which the following is a specification.

This invention relates to new and useful improvements in steering mechanism.

The invention has particularly to do with the steering of four-wheel drive motor vehicles.

The object of the invention is to provide a mechanism, whereby the motive power of the vehicle may be employed in steering the same, thus reducing the labor and making for more efficient control.

A particular object is to provide a prime mover constantly driven by the power plant, together with a hand operated medium for effecting a coupling between the prime mover and the steering gear, when it is desired to turn the front wheels.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a fragmentary view of the front end of a motor vehicle equipped with a steering gear constructed in accordance with my invention, Fig. 2 is a cross-sectional view taken on the line 2—2 of Fig. 1, Fig. 3 is a vertical sectional view taken on the line 3—3 of Fig. 1, Fig. 4 is an enlarged sectional view on the line 4—4 of Fig. 1, Fig. 5 is a detailed view of one of the shifting joints, Fig. 6 is a sectional view on the line 6—6 of Fig. 2, Fig. 7 is a plan view of the front steering rods, and Fig. 8 is a detail of a chain drive for the tumbling shaft.

In the drawings the numeral 10 designates the frame of a motor vehicle having hangers 11 at each side of its front end. A transverse tumbling shaft 12 is journalled in the hangers and extends under the frame. The shaft has a bevel pinion 13 fastened on its central portion and is driven by a bevel gear 14, fast on the front end of a countershaft 15 extending from a worm box 16 from which it receives its rotation, said shaft being supported by a hanger 15′ (Fig. 6). The box is connected with a drive shaft 17 and a cross-shaft 18, driven by the shaft 17, extends under the box. The cross shaft has bevel pinions 19 on its ends and extends through a housing 18′ suitably suspended from the frame.

The pinions 19 drive double face bevel gears 20, mounted loosely on the spindle pins 21 of the steering knuckles. The pinions 20 drive bevel gears 22 fastened to the inner sides of the front wheels 23. It is to be understood that the front wheels may be driven in any suitable manner. The tumbling shaft may also be driven in any suitable manner and as a further illustration in Fig. 8, I have shown the shaft equipped with a sprocket wheel 24 at one end driven by a chain 25 passing around a sprocket wheel 26 mounted on the cross-shaft 18. This mechanism may be duplicated at the other end of the shaft 12. When this form is employed the parts 13, 14 and 15 are not required.

A platform 27 is mounted across the frame and has an upstanding collar 28 at its center. A vertical steering post 29 extends through the collar and has a flange 30 resting on the collar, whereby the post is supported. A handle lever 31 extends rearwardly from the upper end of the post. On the lower end of the post is fastened a yoke 32 which is swung when the post is turned by the handle lever. Shifting rods 33 have their ends carried by hangers 34 (Figs. 1, 2 and 4) swiveled at their upper ends to the platform. These rods extend on each side of the shaft 15 parallel to the tumbling shaft 12. The shaft 12 has right and left hand threads on opposite sides of the pinion 13.

The shifting rods form guides for clutch blocks 35, each threaded to engage one side of the shaft 12. These blocks are connected to a cross bar 36 by upright arms 37 having lugs 39 at their upper ends engaging in loops 38 on the blocks. A leg 40 (Fig. 4) depends from the cross bar 36 and is made fast to the bridle rod 41 which is connected to the steering arms 42 of the spindles of the front wheels. Thus when the cross bar 36 is shifted in either direction the rod 41 is likewise shifted and the front wheel turned. The usual steering column 43 has a crank 44 on its lower end pivoted to a connecting rod 45 attached to the rod 41 (Fig. 7).

The blocks are alternately shifted into engagement with the shaft 12 and for this purpose bell-crank levers 46 pivoted on brackets 47 are employed. These levers are pivoted to the hangers 34 at the ends of the rods 33, each pair being connected by a pitman 48. The central levers 46 have their inner ends provided with slots 49 for receiving the pivotal connection with the yoke 32 (Fig. 5), whereby the yoke may be shifted to either side and only swing the levers 46 on the side to which it is shifted, whereby the rod 33 on that side will be shifted and the block 35 associated therewith will be clutched with the shaft 12.

In operation the parts are normally positioned as is shown in the drawings. If it should be desired to turn to the left the lever 31 is swung to the left. The tumbling shaft 12 is kept in motion by the power plant of the vehicle. The handle lever 31 swings the yoke 32 by rotating the post 29. The right hand end of the yoke by reason of the slot 49 (Fig. 5) does not operate the levers 46 on that side, but the left hand end swings the levers 46 on the left hand side. When the levers 46 are swung the left hand shifting rod 33 is swung toward the tumbling shaft 12 and the left hand clutch block 35 is engaged with the left hand threads of the shaft 12. The shaft 12 being in motion, the block will be impelled by the threads and caused to slide on the rod 33 toward the left hand side of the frame.

When the block is slid it moves the crossbar 36 which through the leg 40 shifts the rod 41 to the left. The rod 41 swings the arms 42 of the spindles, whereby the front wheels 23 are turned to steer the vehicle toward the left. By swinging the handle lever 31 to a central or neutral position, the the block 35 is disengaged from the tumbling shaft. When the lever 31 is swung to the right the operation is reversed and the front wheels would be brought to a central position by operation of the right hand block 35 and its shifting means. If the clutched engagement of the right hand block is maintained after the wheels are straightened or if the lever is swung to the right with the wheels straight, said wheels will be swung to the right as is obvious.

Various changes in the arrangement and structure of the different elements as well as modifications and alterations, may be made within the scope of the appended claims.

What I claim, is:

1. In a steering mechanism for four-wheel drive motor vehicles, the combination with a frame, the front wheels, and the power plant, of a front wheel driving means, of an oppositely threaded tumbling shaft mounted on the frame and driven constantly by said driving means, steering elements connected with the front wheels, an operating member connected with said steering elements, a shifting means connected with the operating element including clutch members adapted to alternately engage the threads of the tumbling shaft, and hand operated means for manipulating the shifting means to engage the clutch members with the shaft.

2. In a steering mechanism for four-wheel drive motor vehicles, the combination with a frame, the front wheels, and the power plant, of a front wheel driving means, of an oppositely threaded tumbling shaft mounted on the frame and driven constantly by said driving means, steering elements connected with the front wheels, an operating member connected with the steering elements, a pair of shifting rods, clutch blocks slidable on said rods and adapted to engage said shaft, said blocks being connected with said operating element, and hand operated means connected with said rods for shifting the same to clutch the blocks with the shaft.

3. In a steering mechanism for four-wheel drive motor vehicles, the combination with a frame, the front wheels, and the power plant, of a front wheel driving means, of an oppositely threaded tumbling shaft mounted on the frame and driven constantly by said driving means, steering elements connected with the front wheels, an operating member connected with the steering elements, a pair of shifting rods, clutch blocks slidable on said rods and adapted to engage said shaft, said blocks being connected with said operating element, bell-crank levers connected in pairs and connected with the shifting rods for alternately shifting the same, a yoke connected with said levers, and a hand lever connected with said yoke for swinging the same.

4. In a steering mechanism for four-wheel drive motor vehicles, the combination of a tumbling shaft having opposite screw threads, means for constantly driving said shaft, shifting rods, clutch blocks slidable on the rods and adapted to engage the threads of the shaft, bell crank levers connected with the blocks, a cross bar for connection with the steering rod of a motor vehicle connected to the blocks, a yoke pivoted between adjacent bell-crank levers and having loose connection therewith, whereby said yoke may be swung to one side without operating the lever on the other side, a post connected to the yoke, and a handle lever connected with the post.

In testimony whereof I affix my signature.

GEORGE W. SMITH.